H. C. BALCH.
SELF HEATING SOLDERING IRON.
APPLICATION FILED NOV. 19, 1913.
1,108,666.
Patented Aug. 25, 1914.
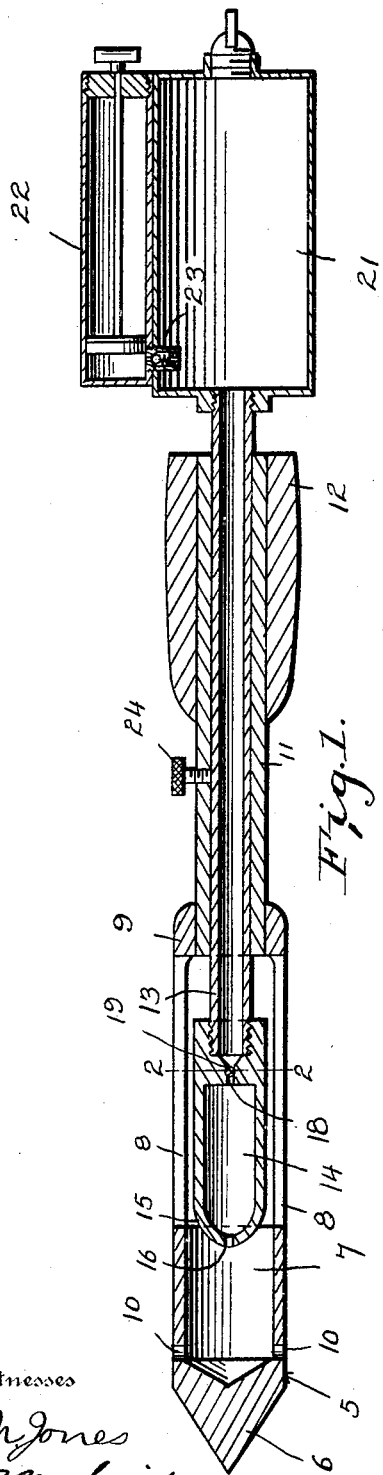
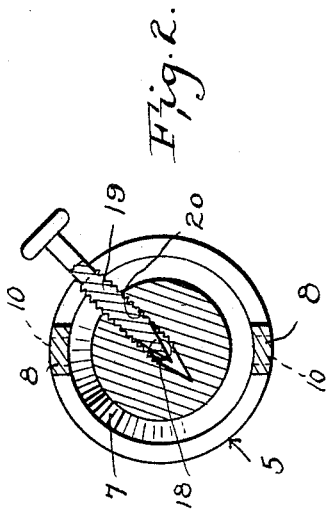
Witnesses
R. N. Jones
R. M. Smith
Inventor
H. C. Balch.
By
R. Randolph Jr.
Attorney.

UNITED STATES PATENT OFFICE.

HERBERT C. BALCH, OF MUNISING, MICHIGAN.

SELF-HEATING SOLDERING-IRON.

1,108,666. Specification of Letters Patent. Patented Aug. 25, 1914.

Application filed November 19, 1913. Serial No. 801,938.

*To all whom it may concern:*

Be it known that I, HERBERT C. BALCH, a citizen of the United States, residing at Munising, in the county of Alger and State of Michigan, have invented certain new and useful Improvements in Self-Heating Soldering-Irons; and I do hereby declare the following to be a full, clear, and exact description of the invention, such as will enable others skilled in the art to which it appertains to make and use the same.

This invention relates to improvements in soldering irons and more particularly to those of the self-heating type, wherein a flame is directed constantly against the interior of the head to maintain the latter at a proper temperature.

One of the objects of the invention is to provide a soldering iron of this type which shall be of extremely simple construction, cheap to manufacture and which will operate successfully when various fuels are used, such as gasolene, alcohol, acetylene gas et cetera.

Another and more specific object of the invention is to provide a soldering iron, having a hollow head, a burner, whereby a flame may be directed against the interior of said head, and means permitting an adjustment of the burner with respect to the head in order that the heating effect of a constant flame may be varied.

The invention also aims to generally improve self-heating soldering irons of this nature to render them more useful, practical and commercially desirable.

With these and other objects in view as will become more apparent as the description proceeds, the invention consists in certain novel features of construction, combination and arrangement of parts, as will be hereinafter more fully described and claimed.

For a complete understanding of my invention reference is to be had to the following description and accompanying drawings, in which—

Figure 1 is a longitudinal sectional view through my improved soldering iron, and Fig. 2 is a transverse sectional view taken on the plane of line 2—2 of Fig. 1.

Referring in detail to the drawings by numerals, 5 designates the head of the soldering iron which has a cylindrical body and a square pointed end portion 6. The body is centrally recessed, as indicated by the numeral 7 and is connected by a pair of arms 8 to a collar 9. The head is preferably formed of copper and is provided with vents 10 which communicate with the central chamber 7 thereof.

A tubular stem or shank 11 is rigidly secured at its outer end within the collar 9 and carries upon its inner end a preferably wooden handle 12, but it will be understood that this handle may be made of any desired material, which is suitable for the purpose.

Extending through the tubular shank or stem 11 is a conveyer tube 13 to the outer end of which is secured a burner 14. The burner is a hollow cylindrically shaped member, having its outer end rounded, as indicated by the numeral 15, and provided with a port or vent 16. A partition 17 is formed within the burner adjacent the inner end and is provided with a central duct 18, the passage through which may be controlled by a needle valve 19. This valve threads through a transverse recess 20 which communicates with the duct 18.

A tank 21 is threadedly secured to the inner end of the conveyer tube 13 and is adapted to contain gasolene, alcohol or similar fuel. Upon one side of the tank is mounted a pump 22, whereby air may be forced into the tank through the nipple 23. It will, of course, be understood that acetylene gas may be used as well as gasolene or alcohol by dispensing with the tank 21 and making suitable gas connections with the feed pipe 13. A set screw 24 is threaded through the shank 11 into engagement with the conveyer tube 13 so that the tube may be locked against movement relative to the shank.

In use, fuel is forced through the tube 13 and duct 18 into the head 14, from whence it passes through the vent 16 and is ignited, so that the flame will play against the interior of the hollow head 5. It will be apparent that the heating effect of this flame may be varied by loosening the set screw 24 and moving the burner either toward or away from the head, as may be desired.

While I have shown and described the preferred embodiment of my invention, it will be understood that minor changes in construction, combination and arrangement of parts may be made without departing from the scope and spirit of the invention as claimed.

Having thus described my invention, I claim:—

In a self-heating soldering iron, a hollow cylindrical head open at its inner end, a pair of arms extending longitudinally from the inner end of said head, a tubular shank connected to the inner ends of said arms, a fuel conveying tube slidable through said shank, a cylindrical burner having a longitudinal chamber formed therein adjacent its outer end, a vent piercing the outer end wall of the burner and communicating with the longitudinal chamber, a threaded socket formed in the other end of the burner to receive the outer end of the fuel tube, a passage connecting said socket with the chamber of the burner, and a needle valve threaded transversely into the burner to control the flow of fuel through said passage.

In testimony whereof I affix my signature in presence of two witnesses.

HERBERT C. BALCH.

Witnesses:
 ALBIN C. BLOM,
 GILBERT S. MEEKER.

---

Copies of this patent may be obtained for five cents each, by addressing the "Commissioner of Patents, Washington, D. C."